United States Patent
Kizaki

(10) Patent No.: US 7,977,002 B2
(45) Date of Patent: Jul. 12, 2011

(54) FUEL CELL SYSTEM AND MOBILE ARTICLE

(75) Inventor: Mikio Kizaki, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 756 days.

(21) Appl. No.: 12/083,627

(22) PCT Filed: Nov. 21, 2006

(86) PCT No.: PCT/JP2006/323627
§ 371 (c)(1),
(2), (4) Date: Apr. 16, 2008

(87) PCT Pub. No.: WO2007/066530
PCT Pub. Date: Jun. 14, 2007

(65) Prior Publication Data
US 2009/0258270 A1    Oct. 15, 2009

(30) Foreign Application Priority Data

Dec. 7, 2005  (JP) ................................. 2005-354059

(51) Int. Cl.
*H01M 8/04* (2006.01)
(52) U.S. Cl. ........................................ 429/450; 429/428
(58) Field of Classification Search .................... None
See application file for complete search history.

(56) References Cited

U.S. PATENT DOCUMENTS

2005/0112424 A1   5/2005   Hirano

FOREIGN PATENT DOCUMENTS

| | | |
|---|---|---|
| JP | 2000-315514 A | 11/2000 |
| JP | 2001-332281 A | 11/2001 |
| JP | 2002-110187 A | 4/2002 |
| JP | 2002-313395 A | 10/2002 |
| JP | 2004-111196 A | 4/2004 |
| JP | 2004-158274 A | 6/2004 |
| JP | 2004-207139 A | 7/2004 |
| JP | 2004-288530 A | 10/2004 |
| JP | 2005-050638 A | 2/2005 |
| JP | 2005-209635 A | 8/2005 |
| WO | WO 2006/057134 A1 | 6/2006 |

*Primary Examiner* — Cynthia Lee
(74) *Attorney, Agent, or Firm* — Kenyon & Kenyon LLP

(57) ABSTRACT

There is disclosed a fuel cell system including a fuel cell for generating electric power by a reaction of a fuel gas an oxidation gas, and a power storage device, and being configured to perform a scavenging operation when an operation of the fuel cell is stopped for discharging a moisture from the fuel cell by supplying a gas into the fuel cell by using the power supplied from the power storage device. The fuel cell system further includes control means for setting an operating condition of the fuel cell so that a moisture content of the fuel cell when it is in operation is less than a target moisture content set in accordance with a state of the power storage device.

4 Claims, 3 Drawing Sheets

Fig.2

| BATTERY TEMPERATURE (°C) | $-T_2$ | $-T_1$ | 0 | $T_1$ | $T_2$ |
|---|---|---|---|---|---|
| AMOUNT OF MOISTURE TO BE DISCHARGED (g/cell) | $Q_1$ | $Q_2$ | $Q_3$ | $Q_4$ | $Q_5$ |

$|T_1| < |T_2|$ $Q_1 < Q_2 < \cdots < Q_5$

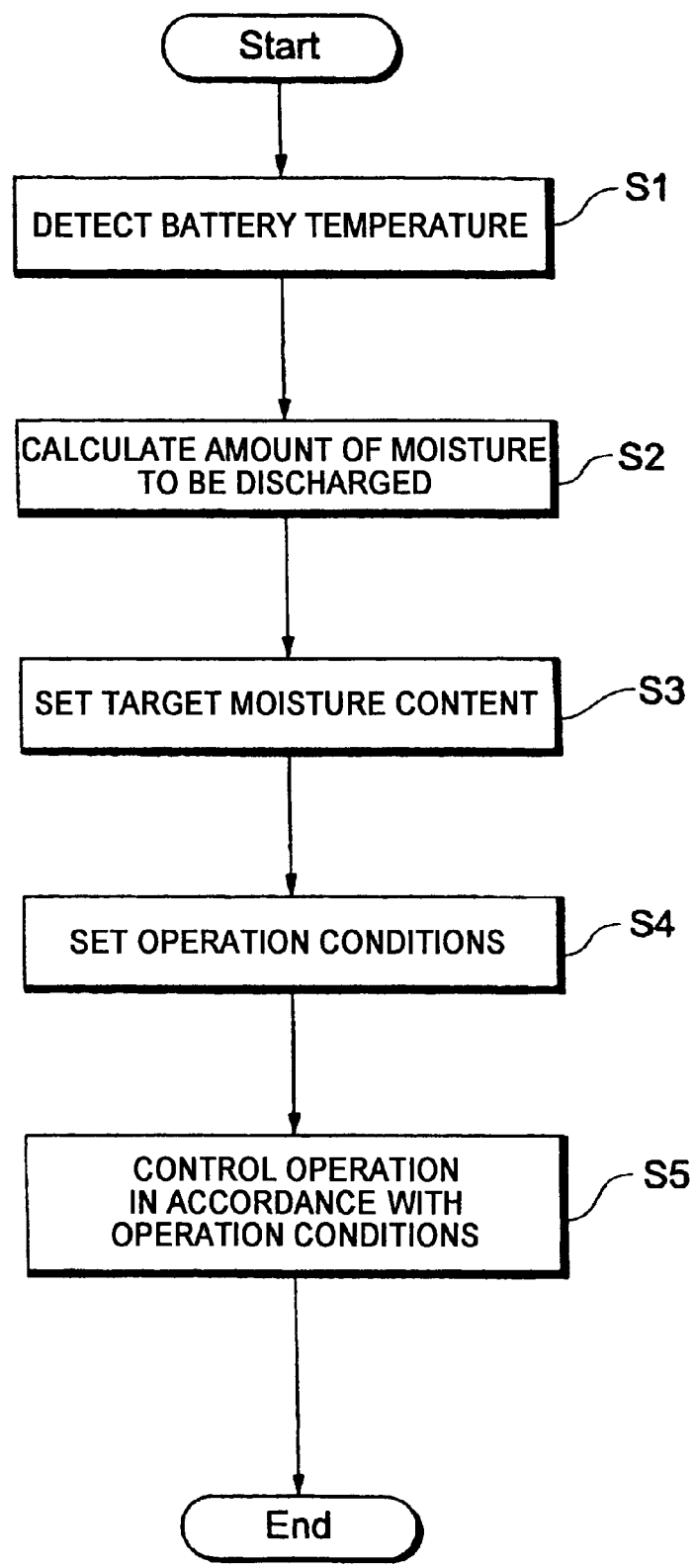

FUEL CELL SYSTEM AND MOBILE ARTICLE

This is a 371 national phase application of PCT/JP2006/323627 filed 21 Nov. 2006, which claims priority of Japanese Patent Application No. 2005-354059 filed 7 Dec. 2005, the contents of which are incorporated herein by reference.

TECHNICAL FIELD

The present invention relates to a fuel cell system and a mobile article.

BACKGROUND ART

At present, a fuel cell system including a fuel cell for generating electric power by receiving supply of reactive gases (a fuel gas and an oxidation gas) to generate electric power has been proposed and put to practical use. When the electric power is generated by such a fuel cell system, moisture is generated in the fuel cell by the electrochemical reaction, and this moisture remains in reactive gas channels of the fuel cell, with the result that a flow of the reactive gas may be possibly hampered. When the fuel cell system is operated under an environment at a low temperature such as a temperature below the freezing point, the moisture remaining in electrodes (a catalytic layer and a diffusion layer) of the fuel cell freezes, and a starting performance remarkably deteriorates in some case.

As a conventional technology to solve various problems caused by the moisture generated in the fuel cell in this manner, a technology (a scavenging technology) is proposed in which dry oxygen or dry hydrogen is supplied to the reactive gas channels when the operation of the fuel cell is stopped to thereby remove the moisture from the fuel cell. In recent years, a technology is proposed to perform a scavenging operation in such a manner that a moisture content included in electrolytic films of the fuel cell is estimated, and a respective device (a compressor, a pump, etc.) is driven and controlled so that this estimated moisture content becomes a predetermined value (see Japanese Patent Application Laid-Open No. 2004-158274, for example).

DISCLOSURE OF THE INVENTION

In addition, a scavenging operation is performed, when the operation of the fuel cell is stopped, by driving and controlling a compressor or a motor by the electric power supplied from the power storage device such as a secondary cell, but the power supply capability of the power storage device deteriorates under an environment at a low temperature such as a temperature below the freezing point. Therefore, even when a technology described in the above publication is employed, the scavenging operation cannot sufficiently be performed under the low-temperature environment, so moisture remains in the fuel cell, and the fuel cell cannot efficiently be started in some case.

The present invention has been developed in view of such situations, and the object thereof is to provide a fuel cell system in which the fuel cell can efficiently be started even under the low-temperature environment.

To achieve the above-identified object, a fuel cell system according to the present invention comprises a fuel cell for generating electric power by a reaction of a fuel gas with an oxidation gas, and a power storage device, and is configured to perform a scavenging operation when an operation of the fuel cell is stopped for discharging moisture from the fuel cell by supplying a gas into the fuel cell by using the power supplied from the power storage device, wherein the fuel cell system comprises control means for setting an operating condition of the fuel cell so that a moisture content of the fuel cell when it is in operation is less than a target moisture content set in accordance with a state of the power storage device.

According to such a constitution, the operating condition (a temperature, an amount of power to be generated, etc.) of the fuel cell can be set so that the moisture content of the fuel cell when it is in operation is less than the target moisture content set in accordance with the state of the power storage device. For example, even in a case where it is assumed that an amount of moisture to be discharged from the fuel cell drops owing to deterioration of the power supply capability due to a temperature drop of the power storage device, when the operating condition of the fuel cell is set beforehand to a lower level, the moisture content of the fuel cell when it is in operation can be set to be less than a predetermined target moisture content (e.g., an amount to be set in accordance with a temperature of the power storage device). Therefore, even in a case where the operation of the fuel cell is stopped under the low-temperature environment, it is possible to efficiently start the fuel cell from an operation stop state of the fuel cell.

In the above-mentioned fuel cell system, the control means can set the target moisture content in accordance with a temperature of the power storage device. In this case, the control means sets the operating condition of the fuel cell to a lower level as the temperature of the power storage device is lower so that the moisture content of the fuel cell when it is in operation is less than the target moisture content.

In consequence, even in a case where it is assumed that the amount of the moisture to be discharged from the fuel cell drops owing to the deterioration of the power supply capability due to the temperature drop of the power storage device, when the operating condition of the fuel cell is set beforehand to the lower level, the moisture content of the fuel cell when it is in operation can be set to be less than the target moisture content. Therefore, even in a case where the operation of the fuel cell is stopped under the low-temperature environment, the fuel cell can efficiently be started from the operation stop state of the fuel cell.

Moreover, it is preferable that the fuel cell system comprises heating means for heating the power storage device.

In consequence, since the power storage device can quickly be heated under the low-temperature environment, it is possible to quickly recover the power supply capability of the power storage device.

Furthermore, a mobile article according to the present invention includes the above fuel cell system.

According to such a constitution, since the mobile article includes the fuel cell system capable of setting the operating condition of the fuel cell in accordance with a state of the power storage device, it is possible to provide the mobile article having an excellent starting performance under the low-temperature environment.

According to the present invention, it is possible to provide the fuel cell system capable of efficiently starting the fuel cell even under the low-temperature environment.

BRIEF DESCRIPTION OF THE DRAWINGS

FIG. 2 is a map showing a relation between a battery temperature and an amount of moisture to be discharged of the fuel cell system shown in FIG. 1; and FIG. 3 is a flow chart showing an operation method of the fuel cell system shown in FIG. 1.

BEST MODE FOR CARRYING OUT THE INVENTION

Figure 1:
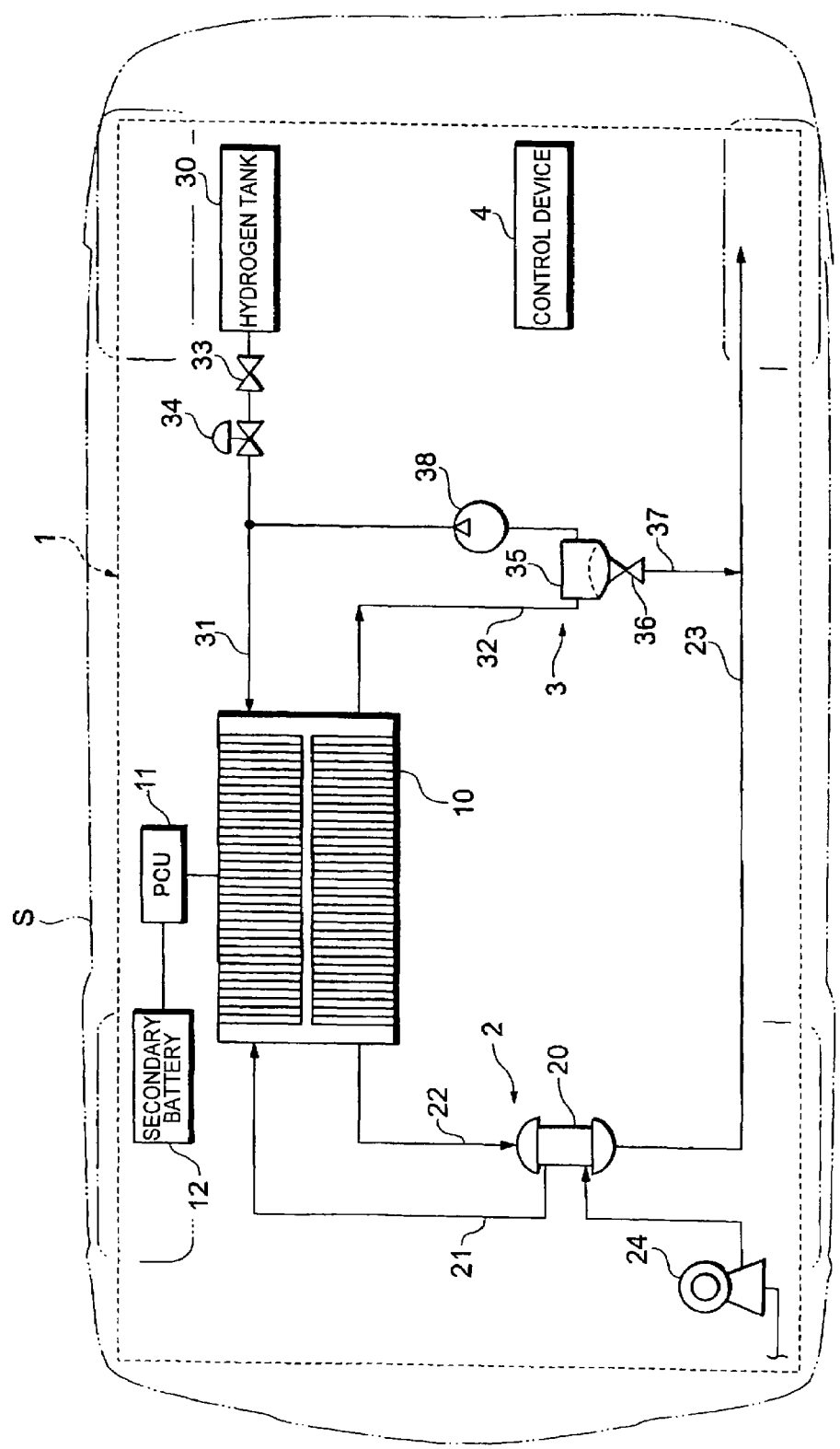
FIG. 1 is a constitution diagram of a fuel cell system according to an embodiment of the present invention.

A fuel cell system 1 according to an embodiment of the present invention will hereinafter be described with reference to the drawings. In the present embodiment, an example in which the present invention is applied to an on-vehicle power generation system of a fuel cell vehicle S (a mobile article) will be described.

First, the constitution of the fuel cell system 1 according to the embodiment of the present invention will be described with reference to FIGS. 1 and 2. As shown in FIG. 1, the fuel cell system 1 according to the present embodiment includes a fuel cell 10 which generates electric power by receiving supply of reactive gases (oxidation gas and fuel gas). Moreover, the system includes an oxidation gas piping system 2 which supplies air as the oxidation gas to the fuel cell 10; a hydrogen gas piping system 3 which supplies a hydrogen gas as the fuel gas to the fuel cell 10; a control device 4 which generally controls the whole system; a secondary battery 12 which supplies the electric power to respective device of the system when the operation of the fuel cell 10 is stopped (when the power generation is stopped) or the like; and the like.

The fuel cell 10 has a stack structure constituted by stacking a required number of layers of single cells which receive the supply of the reactive gases to generate the electric power. The power generated by the fuel cell 10 is supplied to a power control unit (PCU) 11. The PCU 11 includes an inverter which supplies the power to a traction motor of the fuel cell vehicle S; an inverter which supplies the power to various auxiliary machines such as a compressor motor and a motor for a hydrogen pump; a DC-DC converter which charges the secondary battery 12 and which supplies the power from the secondary battery 12 to the motors; and the like.

The secondary battery 12 supplies the electric power to the traction motor and various auxiliary machines to thereby power-assist rapid acceleration and an intermittent operation (during the stop of the power generation of the fuel cell 10). In addition, the secondary battery 12 supplies the power to the compressor motor and the like when the operation of the fuel cell 10 is stopped to thereby realize a scavenging operation (discharge of moisture from the fuel cell 10 by supplying a gas to the fuel cell 10). That is, the secondary battery 12 is one embodiment of a power storage device according to the present invention. As the secondary battery 12, a nickel hydrogen cell or a lithium ion cell may be used.

In the present embodiment, a temperature sensor (not shown) is disposed which detects a temperature of the secondary battery 12. Information on the temperature of the secondary battery 12 detected by the temperature sensor is transferred to the control device 4, and used in control of the operation of the fuel cell system 1. In the present embodiment, a heater (heating means) for heating the secondary battery 12 is disposed. The operation of the heater is controlled by the control device 4. That is, the control device 4 automatically operates the heater to heat the secondary battery 12 in a case where the temperature of the secondary battery 12 detected by the temperature sensor is not more than a predetermined value (e.g., 20° C.).

The oxidation gas piping system 2 includes an air supply channel 21 which supplies the oxidation gas (air) humidified with a humidifier 20 to the fuel cell 10; an air discharge channel 22 which introduces an oxidation off-gas discharged from the fuel cell 10 to the humidifier 20; and an exhaust channel 23 which guides the oxidation off-gas from the humidifier 21 to the outside. The air supply channel 21 is provided with a compressor 24 which takes in the oxidation gas from the atmosphere to blow the gas under pressure to the humidifier 20. The operation of the compressor 24 is controlled by the control device 4.

The hydrogen gas piping system 3 includes a hydrogen tank 30 as a fuel supply source in which the hydrogen gas under a high pressure is stored; a hydrogen supply channel 31 which supplies the hydrogen gas of the hydrogen tank 30 to the fuel cell 10; and a circulation channel 32 which returns a hydrogen off-gas discharged from the fuel cell 10 to the hydrogen supply channel 31.

The hydrogen supply channel 31 is provided with a cutoff valve 33 which interrupts or permits the supply of the hydrogen gas from the hydrogen tank 30; and a regulator 34 which regulates the pressure of the hydrogen gas. In the present embodiment, the regulator 34 of a variable pressure regulation system capable of changing a target value of the supply pressure by a step motor is employed. Operations of the cutoff valve 33 and the regulator 34 are controlled by the control device 4.

The circulation channel 32 is connected to a discharge channel 37 via a gas-liquid separator 35 and an exhaust drain valve 36. The gas-liquid separator 35 recovers the moisture from the hydrogen off-gas. The exhaust drain valve 36 operates in response to an instruction from the control device 4 to thereby discharge (purge) to the outside the moisture recovered by the gas-liquid separator 35 and the impurities-containing hydrogen off gas of the circulation channel 32. The circulation channel 32 is provided with a hydrogen pump 38 which pressurizes the hydrogen off-gas of the circulation channel 32 to blow the gas toward the hydrogen supply channel 31. It is to be noted that the gas of the discharge channel 37 is diluted by a dilution unit (not shown), and combined with the gas of the exhaust channel 23.

The control device 4 receives control information such as an acceleration signal (a required load) of the fuel cell vehicle S to control operations of various devices of the system. It is to be noted that the control device 4 is constituted of a computer system (not shown). Such a computer system includes a CPU, a ROM, a RAM, a HDD, an input/output interface, a display and the like. When the CPU reads various control programs recorded in the ROM to execute the programs, various control operations are realized.

Specifically, the control device 4 performs a "scavenging" operation to discharge the moisture from the fuel cell 10 when the operation of the fuel cell 10 is stopped (when the power generation is stopped), by driving and controlling the compressor 24, the cutoff valve 33 and the regulator 34 to supply the gas (the oxidation gas and the hydrogen gas) into the fuel cell 10 by using the power supplied from the secondary battery 12. It is to be noted that the control device 4 temporarily inhibits or stops humidification of the oxidation gas by the humidifier 20 during the scavenging operation.

Moreover, the control device 4 sets an operating condition of the fuel cell 10 so that a moisture content of the fuel cell 10 when it is in operation is less than a target moisture content set in accordance with the temperature of the secondary battery 12. In other words, the operating condition of the fuel cell 10 is set in accordance with the temperature of the secondary battery 12 so that an estimated moisture content of the fuel cell 10 after the scavenging operation by the secondary battery 12 is less than a startable moisture content of the fuel cell 10. That is, the control device 4 functions as one embodiment of control means according to the present invention. Here, the "estimated moisture content" is the moisture content of the fuel cell 10 after the scavenging operation, which is estimated in consideration of a scavenging capability of the secondary battery 12, and the "startable moisture content" is the moisture content with which the fuel cell 10 can start.

The secondary battery 12 in the present embodiment has such a tendency that as the temperature of the secondary battery 12 becomes lower, the scavenging capability of the secondary battery becomes lower. For example, as shown in a map of FIG. 2, an amount of moisture to be discharged by the secondary battery 12 at a temperature "$T_2$" is "$Q_5$", whereas an amount of moisture to be discharged from each single cell by the secondary battery 12 at a temperature "$-T_2$" (below the freezing point) is "$Q_1 (<Q_5)$". Therefore, in consideration of such a difference of the scavenging capability of the secondary battery 12, the control device 4 sets an operating condition beforehand in accordance with the temperature of the secondary battery 12 so that the estimated moisture content of the fuel cell 10 after the scavenging operation by the secondary battery 12 is less than the startable moisture content.

For example, when the temperature of the secondary battery 12 is "$T_1$", the control device 4 calculates an amount ($Q_4$) of the moisture to be discharged corresponding to that temperature by using the map of FIG. 2. Moreover, the control device 4 sets a startable moisture content ($Q_0$) of the fuel cell 10, and sets, as the target moisture content when the fuel cell is in operation, a value ($Q_0+Q_4$) obtained by adding the amount ($Q_4$) of the moisture to be discharged by the secondary battery 12 to this startable moisture content ($Q_0$). Subsequently, the control device 4 sets the operating condition (the temperature of the fuel cell 10, an amount of the power to be generated and an amount of the reactive gases to be supplied) of the fuel cell 10 so that the moisture content of the fuel cell 10 when it is in operation is less than the target moisture content ($Q_0+Q_4$). According to such control, the estimated moisture content of the fuel cell 10 after the scavenging operation by the secondary battery 12 can be set to be less than the startable moisture content ($Q_0$).

Moreover, when the temperature of the secondary battery 12 is "$-T_1$", the control device 4 calculates an amount ($Q_2 (<Q_4)$) of the moisture to be discharged corresponding to the temperature of the secondary battery by using the map of FIG. 2. Moreover, the control device 4 sets, to the target moisture content when it is in operation, a value ($Q_0+Q_2$) obtained by adding the amount ($Q_2$) of the moisture to be discharged by the secondary battery 12 to the startable moisture content ($Q_0$) of the fuel cell 10. Subsequently, the control device 4 sets the operating condition (the temperature of the fuel cell 10, the amount of the power to be generated and the amount of the reactive gas to be supplied) of the fuel cell 10 to a comparatively lower level so that the moisture content of the fuel cell 10 when it is in operation is less than the target moisture content ($Q_0+Q_2$). According to such control, the estimated moisture content of the fuel cell 10 after the scavenging operation by the secondary battery 12 can be set to be less than the startable moisture content ($Q_0$).

Subsequently, the operating method of the fuel cell system 1 according to the present embodiment will be described with reference to a flow chart of FIG. 3.

During a usual operation of the fuel cell system 1, the hydrogen gas is supplied from the hydrogen tank 30 to a fuel pole of the fuel cell 10 via the hydrogen supply channel 31. Moreover, the humidified and regulated air is supplied to an oxidation pole of the fuel cell 10 via the air supply channel 21 to thereby generate the electric power. In this case, the electric power (required power) to be derived from the fuel cell 10 is calculated by the control device 4, and an amount of the hydrogen gas and the air is supplied into the fuel cell 10 in accordance with the amount of the power to be generated. The fuel cell 10 is in a wet state during the usual operation thereof. Therefore, when the operation of the fuel cell is stopped, the moisture remains in the fuel cell 10. In the present embodiment, after such a usual operation of the fuel cell is stopped, the "scavenging" operation is performed to discharge the moisture from the fuel cell 10. However, under a low-temperature environment, the power supply capability of the secondary battery 12 becomes lower, so the scavenging action is insufficiently performed, and a starting performance may deteriorate in some case. In the present embodiment, the following operating control is performed in order to inhibit such deterioration of the starting performance.

That is, first, the control device 4 of the fuel cell system 1 detects the temperature of the secondary battery 12 by using the temperature sensor (battery temperature detection step: S1). Moreover, the control device 4 calculates the amount of the moisture to be discharged corresponding to the temperature detected by the battery temperature detection step S1 based on the map shown in FIG. 2 (moisture discharge amount calculation step: S2). For example, when the temperature of the secondary battery 12 is "$-T_2$", the amount of the moisture to be discharged is calculated as "$Q_1$".

Next, the control device 4 sets the startable moisture content ($Q_0$) of the fuel cell 10, and sets, to the target moisture content of the fuel cell when it is in operation, a value ($Q_0+Q_1$) obtained by adding the amount ($Q_1$) of the moisture to be discharged calculated by the moisture discharge amount calculation step S2 to this startable moisture content (target moisture content setting step: S3). Moreover, the control device 4 sets the operating condition (the temperature of the fuel cell 10, the amount of the power to be generated and the amount of the reactive gases to be supplied) of the fuel cell 10 so that the moisture content of the fuel cell 10 when it is in operation is less than the target moisture content ($Q_0+Q_1$) set by the target moisture content setting step S3 (operating condition setting step: S4). Subsequently, the control device 4 controls the operation of the fuel cell 10 in accordance with the operating condition set by the operating condition setting step S4 (operation control step: S5).

In the fuel cell system 1 according to the embodiment described above, the operating condition of the fuel cell 10 can be set so that the moisture content of the fuel cell 10 when it is in operation is less than the target moisture content set in accordance with the temperature of the secondary battery 12. That is, even in a case where it is assumed that the amount of the moisture to be discharged from the fuel cell 10 becomes lower owing to the deterioration of the power supply capability due to the temperature drop of the secondary battery 12, when the operating condition of the fuel cell 10 is set beforehand to a lower level, the moisture content of the fuel cell 10 when it is in operation can be set to be less than a predetermined target moisture content. Therefore, even in a case where the operation of the fuel cell 10 is stopped under the low-temperature environment, the fuel cell 10 can efficiently be started from an operation stop state of the fuel cell.

Moreover, the fuel cell system 1 according to the embodiment described above includes the heater which heats the secondary battery 12, and therefore, it is possible to quickly heat the secondary battery 12 under the low-temperature environment. As a result, the power supply capability of the secondary battery 12 can quickly be restored.

Moreover, the fuel cell vehicle S (the mobile article) according to the embodiment described above includes the fuel cell system 1 capable of setting the operating condition of the fuel cell 10 in accordance with the temperature of the secondary battery 12. Therefore, the vehicle has an excellent starting performance under the low-temperature environment.

It is to be noted that in the above embodiment, an example in which the secondary battery 12 is employed as the power storage device has been described, but a capacitor may be employed as the power storage device. In the above embodiment, an example in which the operating condition of the fuel cell 10 is set in accordance with the "temperature" of the secondary battery 12 has been described, but the operating condition of the fuel cell 10 may be set in accordance with another physical amount (e.g., a state of charge: "SOC") indicating a state of the secondary battery 12.

Moreover, in the above embodiment, an example in which the circulation channel 32 is provided with the hydrogen pump 38 has been described, but an ejector may be employed instead of the hydrogen pump 38. In the above embodiment, an example in which the circulation channel 32 is provided with the exhaust drain valve 36 to realize both of exhausting operation and draining operation, but a drain valve which discharges the moisture recovered by the gas-liquid separator 35 to the outside and an exhaust valve which discharges the gas from the circulation channel 32 may separately be arranged so that the control device 4 separately controls the drain valve and the exhaust valve.

INDUSTRIAL APPLICABILITY

As described above in an embodiment, a fuel cell system according to the present invention can be mounted on a fuel cell vehicle, and can be mounted on various mobile articles (a robot, a boat, an airplane, etc.) other than the fuel cell vehicle. The fuel cell system according to the present invention may be applied to a power generation system to be fixed for use as a power generation facility for a structure (a residence, a building, etc.).

The invention claimed is:

1. A fuel cell system comprising a fuel cell for generating electric power by a reaction of a fuel gas with an oxidation gas, and a power storage device, and being configured to perform a scavenging operation when an operation of the fuel cell is stopped for discharging moisture from the fuel cell by supplying a gas into the fuel cell by using a power supplied from the power storage device:

wherein the fuel cell system comprises a control device that is configured to set an operating condition of the fuel cell so that a moisture content of the fuel cell when it is in operation is less than a target moisture content set in accordance with a temperature or a state of charge of the power storage device, said operating condition includes at least one of a temperature of the fuel cell, an amount of power to be generated, and an amount of reactive gases to be supplied to the fuel cell.

2. The fuel cell system according to claim 1, wherein the control device is configured to set the operating condition of the fuel cell to a lower level as the temperature of the power storage device is lower so that the moisture content of the fuel cell when it is in operation is less than the target moisture content.

3. The fuel cell system according to claim 1, further comprising:

a heating apparatus for heating the power storage device.

4. A mobile article comprising the fuel cell system according to claim 1.

* * * * *